United States Patent [19]

Lanza et al.

[11] Patent Number: 4,877,863

[45] Date of Patent: Oct. 31, 1989

[54] PROCESS FOR DECOLORIZING OF POLYMERS OF THE VINYLAROMATIC-CONJUGATED DIENE TYPE

[75] Inventors: Emmanuel Lanza, Waterloo; Jean M. M. G. Naveau, Nivelles, both of Belgium

[73] Assignee: Labofina, S.A., Brussels, Belgium

[21] Appl. No.: 246,993

[22] Filed: Sep. 20, 1988

[30] Foreign Application Priority Data

Sep. 21, 1987 [BE] Belgium ................................. 8701055

[51] Int. Cl.$^4$ .............................. C08F 6/08; C08F 6/06
[52] U.S. Cl. ..................................... 528/486; 524/575; 526/173; 526/340
[58] Field of Search ................ 528/486, 487; 524/575; 526/173, 340

[56] References Cited

U.S. PATENT DOCUMENTS

| | | | |
|---|---|---|---|
| 2,893,982 | 7/1959 | Campbell | 528/486 |
| 3,639,517 | 2/1972 | Kitchen et al. | 526/175 |
| 3,998,797 | 12/1976 | Brandli et al. | 528/487 |
| 4,091,053 | 5/1978 | Kitchen . | |

FOREIGN PATENT DOCUMENTS 84795  8/1983  European Pat. Off. ............ 528/486

Primary Examiner—Joseph L. Schofer
Assistant Examiner—F. M. Teskin
Attorney, Agent, or Firm—William D. Jackson; John K. Abokhair; M. Norwood Cheairs

[57] ABSTRACT

Vinyl aromatic-conjugated diene copolymers having polymer chains which end with an alkali metal and which are obtained by the polymerization in solution of at least one vinyl aromatic hydrocarbon and of a conjugated diene in the presence of a catalyst based on an alkali metal are decolorized by treating the copolymer with a monocarboxylic acid of general formula

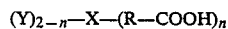

$$(Y)_{2-n}-X-(R-COOH)_n$$

in which X is S, S—CH$_2$—S, or S—S, and Y and R are alkyl radicals having 1 to 16 carbon atoms and n is 1 or 2.

10 Claims, No Drawings

PROCESS FOR DECOLORIZING OF POLYMERS OF THE VINYLAROMATIC-CONJUGATED DIENE TYPE

FIELD OF THE INVENTION

The present invention relates to a process for decolorizing polymers of the vinyl aromatic-conjugated diene block copolymer type. In particular the present invention relates to a process for decolorizing of such polymers the chains of which comprise terminal alkali metals resulting from the initiation of the polymerization or copolymerization.

BACKGROUND OF THE INVENTION

As is well known in decolorizing rubbery hydrogenated polymers, it is a conventional expedient to use a mineral acid or a mono- or polycarboxylic acid to remove the deep color imparted by hydrogenation catalysts. This treatment results in transparent but yellowish polymers. With regard to resinous types of copolymers, particularly those described in U.S. Pat. Nos. 3,639,517 (Kitchen et al.) and 4,091,053 (Kitchen), the color is mainly due to the presence of initiation agents as well as to the presence of agents employed in the process which is used to couple the polymer chains (vinyl aromatic-conjugated diene) to each other. It is very important, not only for appearance but also for uses of the polymers with foodstuffs, to make this yellowish coloration disappear and to obtain perfectly transparent and colorless copolymers.

Methods are known for obtaining transparent copolymers by treating solutions of coupled copolymers with $CO_2$ and water. However, this necessitates distillation of the solvent, to separate water and $CO_2$ from the solvent, before it can be recycled for the the initiator. A consideration is not only transparency and decoloration, but also the fact that the polymer should retain its impact strength properties. It is also known that it is necessary to add to these compositions an anti-oxidant additive to stabilize the butadiene phase during the polymer transformation stage. Indeed the temperatures employed during this stage may involve degradation of the polybutadiene phase; however, the type of additive used may cause discoloration of the polymeric material.

It has also been proposed in European Patent Application Publication No. 84,795 (Mocygemba) to treat the copolymers with dicarboxylic acids. It is understood that with this kind of process it is possible to satisfy practically all the conditions of decoloration mentioned above, but without providing a solution to the problem resulting from addition of an anti-oxidant. It is therefore desirable to have available a process for treating the vinyl aromatic-conjugated diene copolymers so as to ensure their perfect transparency, to retain appropriate impact strength properties, and moreover to satisfy the extremely demanding conditions involved in food supply, and to give them an anti-oxidant activity without requiring an excessive amount of anti-oxidant additive.

SUMMARY OF THE INVENTION

An object of the present invention is to provide a process for decolorizing vinyl aromatic-conjugated diene copolymers.

A further object of the present invention is to provide a process for decolorizing vinyl aromatic-conjugated diene copolymers which yields perfectly transparent copolymers, having good impact strength properties, and which satisfy the demanding criteria set by the food-supply industry.

Another object of the present invention is to provide a process for decolorizing vinyl aromatic-conjugated diene copolymers while reducing the amount of anti-oxidant additive.

According to the present invention there is provided a process for decolorizing vinyl aromatic-conjugated diene copolymers which have polymer chains which end with an alkali metal. The invention comprises treating the copolymer with a thiocarboxylic acid of the formula:

$$(Y)_{2-n}-X-(R-COOH)_n \qquad (I)$$

wherein X is S, S—$CH_2$—S, or S—S, Y and R are alkyl radicals each independently having 1 to 16 carbon atoms, and n is 1 or 2.

DETAILED DESCRIPTION

The process of the present invention is applicable to copolymers of the resinous kind and to those of the elastomeric kind which are prepared by the polymerization in solution of vinyl aromatic and conjugated diene monomers in the presence of initiators of the kind including alkali metals; polymerization occurring in such a way as to form a block copolymer, it being understood that one or more branches of this block copolymer may be constituted by a random copolymer.

This type of polymerization is generally performed in solution in the presence of a solvent and of an initiator which is a compound of an alkali metal. Moreover, during the course of polymerization coupling agents are added so as to couple the polymers. The copolymers thus formed most often occur in a linear or radial form, but possess a coloration which is not acceptable for the desired end uses of the copolymers.

Typical of the polymerization processes which lead to polymers of the type suitable for treatment by the process of the present invention are those described in the above-mentioned U.S. Pat. Nos. 3,639,517 and 4,091,053 and European Patent Application No. 84,795. Such polymerization processes are described in summary fashion below. For more detailed descriptions of polymerization processes suitable for use in regard to the invention, reference is made to U.S. Pat. Nos. 3,639,517 and 4,091,053 and European Patent Application Publication No. 84,795, the entire disclosures of which are incorporated herein by reference.

The polymerization is performed in solution at a temperature of from $-100°$ C. to $+150°$ C., in the presence of a solvent and at a pressure sufficient to maintain the medium in the liquid phase. The solvents employed may be paraffinic, cycloparaffinic or aromatic. Most frequently cyclohexane or a mixture of hexane and cyclohexane is used. Initially a block of nonelastomeric polymer is formed by feeding in vinyl aromatic monomer with a defined quantity of organolithium initiator to form long chains of reactive polymers having a terminal lithium atom on the chain. Then the chains or reactive polymers are contacted with conjugated diene monomers to form chains of polymers with elastomeric and non-elastomeric blocks.

Copolymers with a structure A-B (A=vinyl aromatic, B=conjugated diene) are then contacted with coupling agents to form polymers having a structure A-B-C-B-A in the case of a linear structure, where C is a moiety derived from the coupling agent. It is understood that copolymers with radial or linear structure may be formed, and that the blocks may be formed of pure homopolymers or random copolymers.

Whatever the nature of copolymers obtained, depending on the various polymerization processes, the process of the invention is suitable for decolorizing the copolymers.

Examples of suitable conjugated diene monomers include those having 4–12 carbon atoms, such as 1,3-butadiene, isoprene, 2,3-dimethyl-1-,3butadiene, piperylene, 3-butyl-1,3-octadiene and other analogues. Examples of suitable vinyl aromatic monomers are styrene, alpha-methylstyrene, vinylnaphthalene and other analogues. Since the process is applicable to resinous copolymers as well as to elastomeric copolymers, the conjugated diene/vinyl aromatic ratio by weight may vary within wide limits and particularly from 1/99 to 85/15.

The coupling agents are chosen from among polyvinyl aromatic compounds, polyepoxides, polyisocyanates, polyimines, polyaldehydes, polyketones, polyhalides such as silicon tetrahalide and halosilanes, polyanhydrides and polyesters. Combinations of different kinds of coupling agents may also be used.

Examples of suitable polyvinyl aromatic compounds include divinylbenzene, 1,2,4-trivinylbenzene, 1,3-divinylnaphthalene, 1,3,5-trivinylnaphthalene, 2,4-divinylbiphenyl, and analogues thereof.

Polyepoxide compounds can equally be employed. In general, polymers of epoxidised hydrocarbons are used such as epoxidised liquid polybutadiene or epoxidised vegetable oils such as epoxidised soya oil and epoxidised linseed oil. Other epoxy compounds such as 1,2; 5,6; 9,10;-triepoxydecane may also be used.

Examples of suitable polyisocyanates are benzene-1,2,4-triisocyanate, naphthalene-1,2,5,7-tetraisocyanate and analogues thereof.

Examples of suitable polyimines are oxides or sulphides of triaziridinyl phosphine such as tri(1-aziridinyl) phosphine oxide, tri(2-methyl-1-aziridinyl) phosphine oxide, (2-ethyl-3-decyl-1-aziridinyl) phosphine sulphide, and analogues thereof.

1,4,7-Naphthalenetricarboxaldehyde, 1,7,9-anthracenetri-carboxaldehyde, 1,1,5-pentanetricarboxaldehyde, and analogues thereof are examples of suitable polyaldehydes.

1,4,9,10-Anthracenetetraone, 2,3-diacetonylcyclohexanone, and analogues thereof are examples of suitable polyketones.

Pyromellitic dianhydride, styrene-maleic anhydride copolymers, and analogues thereof are examples of suitable polyanhydrides.

Examples of suitable polyesters are diethyl adipate, triethyl citrate, 1,3,5-tricarbethoxybenzene, and analogues thereof.

Examples of suitable polyhalides are tetrahalides of silicon such as SiCl4, SiBr4 and SiI4, trihalosilanes such as trifluorosilane, trichlorosilane, trichloroethylsilane, triboromobenzylsilane, and analogues thereof, and halogen-substituted hydrocarbons such as 1,3,5-tri(bromomethyl)benzene, 2,5,6,9-tetrachloro-3,7-decadiene, and analogues thereof.

Examples of compounds having more than one functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2, 4,5-diepoxy-3-hexanone, 1,2; 11,12-diepoxy-8-pentadecanone, 1,3; 18,19-diepoxy-7,14-eicosanedione, and analogues thereof.

It is also possible to use other metal halides such as those of tin, lead or germanium as well as polyalkoxides of metals such as silicon tetraethoxide. A difunctional coupling agent may be employed when a linear polymer is desired rather than a branched polymer. In general, the total quantity of coupling agent is from 0.5–1.5 weight parts per hundred parts (pph) of polymer.

According to the process of the invention, the coupled copolymer thus obtained is treated to decolorize it by making the impurities formed by the lithium compounds and other coupling agents react with the thiocarboxylic acids used in accordance with the process of the present invention.

The invention may be used in a very advantageous manner when the process for recovering the copolymer is based on direct elimination of the solvent. Part of the polymerization solvent may be removed before subjecting the polymer to the decolorization treatment of the invention.

In carrying out the invention, the coupled polymer is treated with a monocarboxylic acid of general formula:

$$(Y)_{2-n}-X-(R-COOH)_n \qquad (I)$$

wherein X is S, S—$CH_2$—S, or S—S, Y and R are alkyl radicals each independently having 1 to 16 carbon atoms, and n is 1 or 2.

An indicated by formula (I), thiocarboxylic acids useful in the invention include thio mono- or di-carboxylic acids including dithio derivatives with or without a methylene bridge. Preferred thiocarboxylic acids include monocarboxylic acids such as octyl thiopropionic acid and di-basic acids such as thiodipropionic acid, thiodiglycolic acid, methylenebis(thiopropionic acid) or methylenebis(thioacetic acid).

The quantity of acid to be employed is usually from 0.02–2.0 parts per hundred parts by weight (pph) of polymer and preferably from 0.1–0.5 pph of polymer. The acid may be added to the polymer solution singly or a mixture of thio carboxylic acids may be added to the polymer solution. The acid or acid mixture may be added directly to the thiopolymer solution or in a solvent such as cyclohexane.

By using the thiocarboxylic acids in accordance with the invention, a perfectly transparent polymer can be obtained, and in addition, the polymer acquires a certain anti-oxidant activity which allows a considerable reduction in the amount of anti-oxidant additive, usually of the phosphite type or similar anti-oxidant.

The following examples are given to illustrate the process of the present invention more clearly but without in any way limiting its scope.

EXAMPLE 1

A copolymer of the S/B type was prepared, having a ratio of styrene/butadiene of 75/25 by weight, in a 100 liter capacity reactor equipped with a stirring system.

400 wt. parts of a mixture of cyclohexane and nonpolymerizable $C_4$ hydrocarbons were introduced into a reactor. Also introduced were 0.07 parts of tetrahydrofuran and 52.5 parts of styrene monomer. Polymerization of the styrene was performed in the presence of 0.0336 parts of n-butyllithium as catalyst at a temperature of 50° C. for 15 minutes.

Then a fresh quantity of styrene corresponding to 22.5 parts by weight was added, which was polymerized in the presence of 0.103 parts of n-butyllithium as catalyst at a temperature of 65° C. for 10 minutes.

At the end of this reaction, 25 parts of butadiene were added and copolymerized with the active polystyrene at a temperature of 75° C. for 10 minutes. Coupling of the chains of copolymers formed was then performed by adding 0.51 parts of epoxydised soya oil and carrying out the reaction at a temperature of 80° C. for 15 minutes.

The copolymer thus obtained was then treated with an acid of the invention, in this case octylthiopropionic acid used at a rate of 0.52 parts by weight. Treatment was performed at a temperature of 80° C. for 15 minutes. To this solution were added 0.3 parts of butylated hydroxytoluene (BHT), 0.2 parts of TNPP and 0.3 parts of Irganox 1076 as anti-oxidant. The solution obtained after about 30 minutes stirring was perfectly colorless. Then the styrene/butadiene copolymer was recovered by removal of the volatile solvent by evaporation.

Plates of the copolymer about 3 mm thick were prepared by evaporation of a part of the solution previously obtained. The plate was treated by heating for 20 minutes at 160° C. and was then evaluated for transparency, color and physical properties.

The results obtained are shown in Table 1 in a comparison with the properties of a conventional resin which was not treated with the acid of the invention and which contained 0.3 parts of BHT, 0.7 parts of TNPP and 0.3 parts of Irganox 1076.

TABLE 1

|  | Resin of Example 1 | Untreated resin |
| --- | --- | --- |
| Traction |  |  |
| Elastic limit (MPa) | 18 | 19 |
| Rupture (MPa) | 27 | 22 |
| Lengthening (%) | 240 | 190 |
| Modulus (MPa) | 650 | 675 |
| Bending |  |  |
| Load max. (MPa) | 23 | 24 |
| Modulus (MPa) | 1090 | 1105 |
| Impact strength |  |  |
| Charpy (notched) (K.J/m$^2$) | 15 | 12 |
| Fluidity when hot |  |  |
| MFI (190° C. - 5 kg) (g/10 min) | 3.5 | 3.0 |
| Optical properties |  |  |
| Color | colorless | yellow |
| Transmittance (%) | 90.5 | 84.1 |
| Haze | 5.0 | 9.4 |

The results show that the physical properties of the resin treated in accordance with the invention are improved relative to the conventional resin while substantially less anti-oxidant was used.

The methods of testing were in accordance with the following protocols.
Traction
 DIN 53455
 Rate of elongation : 5 mm/min.
Bending
 DIN 53452
 Rate of deformation : 5 mm/min.
 Supported with a spacing of 50 mm.
Charpy
 DIN 53453
Melt flow index
 ASTM D 1238 (190° C.—5 kg)
Transmittance/Haze
 ASTM D 1003
Color
 Visual examination

EXAMPLE 2

A S/B type copolymer was prepared having a styrene/butadiene ratio of 75/25 by weight as described in Example 1 except that the copolymer was treated with 0.204 parts of 3,3'-thiodipropionic acid for 10 minutes at a temperature of 80° C. To this solution were added 0.3 parts BHT, 0.4 parts TNPP and 0.3 parts Irganox 1076 as anti-oxidant. The solution obtained after about 30 minutes stirring was perfectly colorless. The styrene/butadiene copolymer was recovered and plates of this prepared as indicated in Example 1.

The physical properties and the transparency obtained are shown in Table 2.

TABLE 2

| Traction |  |
| --- | --- |
| Elastic limit (MPa) | 20 |
| Rupture (MPa) | 28 |
| Lengthening (%) | 275 |
| Modulus (MPa) | 698 |
| Bending |  |
| Load max. (MPa) | 26 |
| Modulus (MPa) | 1185 |
| Impact strength |  |
| Charpy (notched) (K.J/m$^2$) | 19 |
| Fluidity when hot |  |
| MFI (190° C. - 5 kg) (g/10 min.) | 4.3 |
| Optical properties |  |
| Color | colorless |
| Transmittance (%) | 91.8 |
| Haze | 4.5 |

EXAMPLE 3

A S/B type block copolymer having a styrene/butadiene ratio of 75/25 by weight was prepared as described in Example 1 except that the copolymer was treated with 0.236 parts of methylenebis(thioacetic acid) for 12 minutes at a temperature of 80° C. To this solution was added 0.3 parts BHT, 0.15 parts TNPP and 0.3 parts Irganox 1076 as anti-oxidant. The solution obtained after about 30 minutes stirring was perfectly colorless. The styrene/butadiene copolymer was recovered and plates of this prepared as indicated in Example 1.

The physical properties and the transparency obtained are shown in Table 3.

TABLE 3

| Traction |  |
| --- | --- |
| Elastic limit (MPa) | 17 |
| Rupture (MPa) | 26 |
| Lengthening (%) | 237 |
| Modulus (MPa) | 640 |
| Bending |  |
| Loading (MPa) | 24 |
| Modulus (MPa) | 1120 |
| Impact strength |  |
| Charpy (notched) (K.J/m$^2$) | 21 |
| Fluidity when hot |  |
| MFI (190° C. - 5 kg) (g/10 min.) | 5.1 |
| Optical properties |  |
| Color | colorless |
| Transmittance | 90.2 |
| Haze | 4.0 |

Comparative examples were carried out using mono- and di-basic carboxylic acids which did not incorporate a thio bridge as present in the acids employed in the present invention. In one comparative example, Example 3 was replicated except that stearic acid was substituted for the methylenebis(thioacetic acid) of Example 3. The stearic acid was used in the amount of 0.72 wt. parts/100 parts polymer. The solution of the polymer was a clear yellow and the polymer plates were opaque. In another comparative example, the procedure of Example 1 was replicated using diglycolic acid as the treating acid. The diglycolic acid was used in an amount of 0.163 parts by wt. The polymer solution, after stirring for 30 minutes, was practically colorless. A plate of copolymer having a thickness of about 3 mm was formed and treated for 20 minutes at 160° C. The plate was transparent but had a very slight yellow tint. The melt flow index was 5.05 g/10 min.

We claim:

1. A process for decolorizing vinyl aromatic-conjugated diene copolymers which have polymer chains which end with an alkali metal and are obtained by solution polymerization of at least one vinyl aromatic hydrocarbon and a conjugated diene in the presence of a catalyst based on an alkali metal, comprising treating the copolymer in solution with a thiocarboxylic acid of the formula:

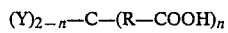  (I)

wherein: X is S, S—CH$_2$—S, or S—S, Y and R are alkyl radicals each independently having 1 to 16 carbon atoms, and n is 1 or 2.

2. The process of claim 1, wherein the copolymer is treated with an acid selected from the group consisting of octyl thiopropionic acid, thiodipropionic acid, thiodiglycollic acid, methylenebis(thiopropionic acid) and methylenebis(thioacetic acid).

3. The process of claim 1 wherein the conjugated diene is selected from the group consisting of 1,3-butadiene, isoprene and 2,3-dimethyl-1,3-butadiene.

4. The process of claim 1, wherein the vinyl aromatic hydrogen is selected from the group consisting of styrene, alphamethylstyrene and vinyltoluene.

5. The process according to claim 1 wherein the copolymer is a conjugated diene/vinyl aromatic block copolymer in which the conjugated diene/vinyl aromatic weight the ratio is from 1:99 to 85:15.

6. The process of claim 5 wherein the block copolymer is a butadiene/styrene copolymer.

7. The process of claim 1 wherein the monocarboxylic acid is employed at a rate of 0.02 to 2 parts per 100 parts of copolymer.

8. The process of claim 7 wherein said thiocarboxylic acid is employed at a rate of 0.1–0.5 parts per 100 parts of copolymer.

9. The process of claim 1 wherein the thiocarboxylic acid is added directly to the solution of copolymer.

10. The process of claim 1 wherein the thiocarboxylic acid incorporated in a solvent and then added to the solution of copolymer.

* * * * *